United States Patent
Amiel et al.

(10) Patent No.: US 9,621,527 B2
(45) Date of Patent: Apr. 11, 2017

(54) METHOD OF LOADING DATA INTO A PORTABLE SECURE TOKEN

(75) Inventors: Patrice Amiel, Aix-lesmilles (FR); Xavier Berard, Cadolive (FR); Eric Preulier, Camps la Source (FR); Frederic Gallas, Aubagne (FR)

(73) Assignee: GEMALTO SA, Meudon (FR)

(*) Notice: Subject to any disclaimer, the term of this patent is extended or adjusted under 35 U.S.C. 154(b) by 191 days.

(21) Appl. No.: 13/885,296

(22) PCT Filed: Oct. 28, 2011

(86) PCT No.: PCT/EP2011/068977
§ 371 (c)(1),
(2), (4) Date: Aug. 2, 2013

(87) PCT Pub. No.: WO2012/065829
PCT Pub. Date: May 24, 2012

(65) Prior Publication Data
US 2013/0305339 A1    Nov. 14, 2013

(30) Foreign Application Priority Data
Nov. 15, 2010    (EP) ..................... 10306254

(51) Int. Cl.
*H04L 29/06*    (2006.01)
*G06F 21/77*    (2013.01)
*G07F 7/10*    (2006.01)

(52) U.S. Cl.
CPC .............. *H04L 63/08* (2013.01); *G06F 21/77* (2013.01); *G07F 7/1008* (2013.01); *H04L 63/0853* (2013.01)

(58) Field of Classification Search
None
See application file for complete search history.

(56) References Cited

U.S. PATENT DOCUMENTS 7,363,486 B2 * 4/2008 Audebert ................ H04L 63/08
                                                      713/150
8,532,301 B2 * 9/2013 Ma ........................ H04L 9/0819
                                                      380/278

(Continued)

OTHER PUBLICATIONS

Alvin Chan, Cookies On-the-Move: Managing Cookies on a Smart Card © 2004, ACM, 5 pages.*

(Continued)

*Primary Examiner* — Jeffrey Pwu
*Assistant Examiner* — Baotram Tran
(74) *Attorney, Agent, or Firm* — Buchanan Ingersoll & Rooney PC

(57) ABSTRACT

The invention is a method for loading data into a portable secure token comprising a plurality of security domains. A first security domain comprises a first administration agent and a second security domain comprises a second administration agent. A remote application server comprises a first data to be provided to the second administration agent. A syndication server, which is distinct from the remote application server, contains a list which comprises a reference to the first data. The list is sent in response to a polling request that is sent by the first administration agent. This list is comprised in a polling response which is sent by the syndication server.

14 Claims, 3 Drawing Sheets

(56) References Cited

U.S. PATENT DOCUMENTS

| | | | | |
|---|---|---|---|---|
| 8,555,273 | B1* | 10/2013 | Chia | G06F 8/665 717/168 |
| 8,887,989 | B2* | 11/2014 | Fang | G06Q 20/123 235/375 |
| 2004/0049628 | A1* | 3/2004 | Lin | G06F 9/4843 711/103 |
| 2004/0083472 | A1* | 4/2004 | Rao | G06F 8/65 717/171 |
| 2007/0015538 | A1* | 1/2007 | Wang | G06F 9/4448 455/558 |
| 2007/0107048 | A1* | 5/2007 | Halls | G06F 21/33 726/4 |
| 2007/0234332 | A1* | 10/2007 | Brundridge | G06F 8/65 717/168 |
| 2007/0288683 | A1* | 12/2007 | Panabaker | G06F 12/06 711/101 |
| 2008/0060055 | A1* | 3/2008 | Lau | H04L 63/0823 726/3 |
| 2009/0291712 | A1* | 11/2009 | Park | H04B 1/3816 455/558 |
| 2009/0298478 | A1* | 12/2009 | Tyhurst | H04L 67/34 455/414.1 |
| 2010/0017499 | A1* | 1/2010 | Martinent | H04W 8/245 709/219 |
| 2010/0030904 | A1* | 2/2010 | Oda | H04L 65/1016 709/228 |
| 2010/0067631 | A1* | 3/2010 | Ton | H04L 12/5895 375/358 |
| 2010/0167816 | A1* | 7/2010 | Perlman | A63F 13/12 463/30 |
| 2010/0234002 | A1* | 9/2010 | Scheffer | G06Q 30/02 455/414.3 |
| 2010/0304670 | A1* | 12/2010 | Shuo | H04M 1/7253 455/41.1 |
| 2010/0311404 | A1* | 12/2010 | Shi | H04W 8/205 455/419 |
| 2010/0311418 | A1* | 12/2010 | Shi et al. | 455/432.1 |
| 2010/0322425 | A1* | 12/2010 | Park | H04L 63/0428 380/270 |
| 2011/0029671 | A1* | 2/2011 | Deprun | H04L 63/20 709/225 |
| 2011/0106379 | A1* | 5/2011 | Fujii | G01C 21/3647 701/36 |
| 2011/0119497 | A1* | 5/2011 | Tsai | G06F 21/77 713/185 |
| 2011/0126002 | A1* | 5/2011 | Fu | H04L 63/0823 713/156 |
| 2011/0296182 | A1* | 12/2011 | Jia | G06Q 20/32 713/168 |
| 2011/0314462 | A1* | 12/2011 | Clark | G06F 8/65 717/169 |
| 2011/0320401 | A1* | 12/2011 | Mahajan | A63F 13/00 707/614 |
| 2012/0106533 | A1* | 5/2012 | Chen | H04W 4/001 370/342 |
| 2012/0246404 | A1* | 9/2012 | Malzahn | G06Q 20/341 711/115 |
| 2013/0074163 | A1* | 3/2013 | Murakami | G06F 21/10 726/4 |
| 2013/0117766 | A1* | 5/2013 | Bax | G06F 9/4405 719/323 |
| 2013/0203465 | A1* | 8/2013 | Ali | H04W 4/003 455/558 |
| 2014/0027506 | A1* | 1/2014 | Heo | G06K 19/0725 235/380 |

OTHER PUBLICATIONS

Au et al., Cross-Domain One-Shot Authorization using Smart Cards © 2000, CAN, 8 pages.*

Babennko et al., Instrumental System for Analysis if Information Syatem Using Smart Cards Protection, © 2014, ACM, 6 pagesCasset et al., Increasing Smart Card Dependability, © 1999, European IST, 4 pages.*

Chang et al., Security Design for Three-Party Encrypted Key Exchange Protocol Using Smart Cards, © 2004, 5 pages.*

Marie et al., A New Convergent Identity System Based on EAP-TLS Smart Cards, © 2011, IEEE, 6 pages.*

Phillips et al., Recovering data from USB Flash memory sticks that have been damaged or electronically erased, © 2008, ICST, 6 pages.*

Schaefer et al., Using Smart Cards for Secure and Device Independent User Interfaces, © 2007, ACM, 8 pages.*

Casset et al., Increasing Smart Card Dependability, © 1999, European IST, 4 pages.*

Globalplatform: "Remote Application Management Over HTTP Card Specification v 2.2—Amendment B, Version 1.1" (Jun. 1, 2009), Retrieved from the Internet: URL:http: //www.globalplatform.org/specificationscard.asp, pp. 1-25, XP-002590002.

Globalplatform: "GlobalPlatform Card—Card Specification—Networked Framework, Version 1.0" Internet Citation, (Sep. 1, 2009), Retrieved from the Internet: URL:http: //www.globalplatform.org/specificationscard.asp, pp. 1-59, XP002590000.

* cited by examiner

METHOD OF LOADING DATA INTO A PORTABLE SECURE TOKEN

FIELD OF THE INVENTION

The present invention relates to the methods of loading data into portable secure tokens. It relates particularly to methods of loading data into portable secure tokens containing a plurality of entities intended to get data thanks to polling mechanisms. In particular, such portable secure tokens may be SIM cards.

PRIOR ART

Portable secure tokens are small machines comprising a memory, a microprocessor and an operating system for computing treatments. Portable secure tokens are intended to connect—either in contact or contactless mode—a host machine which may provides power and a user interface. In general, portable secure tokens comprise a plurality of memories of different types. For example, they may comprise memory of RAM, ROM, EEPROM or Flash type. Portable tokens have limited computing resources. For example, smart cards are secure electronic tokens.

In Telecom domain, a Universal Integrated Circuit Card (UICC) is connected to a mobile phone. Usually the UICC polls a distant server to know if there is some content to be delivered to the UICC. For example, the UICC may poll a remote server using the Over-The-Air mechanism (OTA) over HyperText Transfer protocol (HTTP) or secured HyperText Transfer protocol (HTTPS). The UICC may embed one or several applications which need to poll one or several distant application servers. When an application polls the remote server, most of the time, there is no data to be retrieved by the application. A problem is that such a polling mechanism generates a lot of useless communications between each UICC and the distant server. A useless polling message means that the polling message does not lead to a loading of data in the secure token. When only one entity is in polling mode, it is easy to configure the polling period to make the number of useless communication be acceptable. However, it is far more complex to evaluate the overall behaviour when several entities are requesting sessions for communicating with the remote servers.

Moreover a UICC may comprise several security domains as defined by Global Platform smart card specifications V2.2 and Amendment B. A security domain comprises an Admin Agent (also named administration agent) which is able to manage its own polling mechanism. When a plurality of applications belongs to different security domains, the number of polling messages sent by a UICC cannot be optimized because each Admin Agent works independently.

It is known to use a specific application which is embedded in a secure token. This specific application allows managing automatic polling policies based on time or on a preset event. It is consequently possible to optimize the polling for a security domain. Unfortunately, this solution is restricted to applications which belong to a same security domain for polling.

It is known to maximize the duration between two polling requests so that the global polling performed from the UICC is limited. This solution is often not compatible with business requirements because most of the applications need regular updates.

The polling mechanism is based on the principle of pull. In a pull mechanism, the UICC takes the initiative in requesting data to a distant server. Another known solution is to use a Push mechanism instead of a Pull mechanism. In the Push mechanism, the distant server takes the initiative in sending data to an application of the UICC. Unfortunately, the push mechanism presents many drawbacks regarding server-side and network consumption.

There is a need to provide a solution for optimizing the polling mode for a plurality of components attached to different security domains.

SUMMARY OF THE INVENTION

An object of the invention is to solve the above mentioned technical problem. The invention allows reducing the number of messages exchanged between a portable secure token comprising several applications and the applications servers corresponding to these applications. The invention relies on an admin agent which polls a particular server—called syndication server—and receives a list of actions to be performed by at least another admin agent of the portable secure token. Thus the number of admin agents which regularly polls application servers may be reduced for a portable secure token. The corresponding application servers are assumed to declare a list of operations targeting the portable secure token to the syndication server.

The object of the present invention is a method for loading data into a portable secure token. The secure token comprises a plurality of security domains. A first security domain comprises a first administration agent and a second security domain comprises a second administration agent. A remote application server comprises a first data to be provided to the second administration agent. A list is sent in response to a polling request. This list comprises a reference to the first data. A syndication server contains the list. The polling request is sent by the first administration agent. The list is comprised in a polling response sent by the syndication server. The syndication server is distinct from the remote application server.

Advantageously, the method may comprise the steps of sending the list from the first administration agent to the second administration agent, and of retrieving said data by the second administration agent from the remote application server, by using the list.

Advantageously, the polling request may be sent through a first communication protocol and said first data may be loaded into the secure token through a second communication protocol which has security features superior to the first communication protocol.

In one embodiment, the first communication protocol may be HTTP and said second communication protocol may be HTTPS.

Advantageously, the list may be updated in the syndication server after the first data has been loaded into the secure token.

In one embodiment, said syndication server may comprise a second list targeting said first administration agent. The second list may comprise a reference to a second data which is stored in a second remote application server. The polling response may comprise the second list.

Advantageously, the second security domain may comprise an application and said first data may be provided to said application by the second administration agent.

Another object of the invention is portable secure token comprising a plurality of security domains in which a first security domain comprises a first administration agent, and in which a second security domain comprises a second administration agent. The first administration agent is adapted to send a polling request to a preset server and to receive a polling response. The second administration agent is intended to get a first data from a remote application server. The preset server is a syndication server distinct from the remote application server. The first security domain comprises first and second means. The first means is adapted to identify a list comprising a reference to the first data in said polling response. The second means is adapted to send the list to the second administration agent.

Advantageously, said first administration agent may be adapted to send the polling request through a first communication protocol and said second administration agent may be adapted to load the first data in the secure token through a second communication protocol which has security features superior to the first communication protocol.

In one embodiment, said first communication protocol may be HTTP and said second communication protocol may be HTTPS.

BRIEF DESCRIPTION OF THE DRAWINGS

Other characteristics and advantages of the present invention will emerge more clearly from a reading of the following description of a number of preferred embodiments of the invention with reference to the corresponding accompanying drawings in which.

DETAILED DESCRIPTION OF THE PREFERRED EMBODIMENTS

The invention may apply to any types of portable secure token comprising several admin agents able to establish a communication session with distant application servers.

Figure 1:
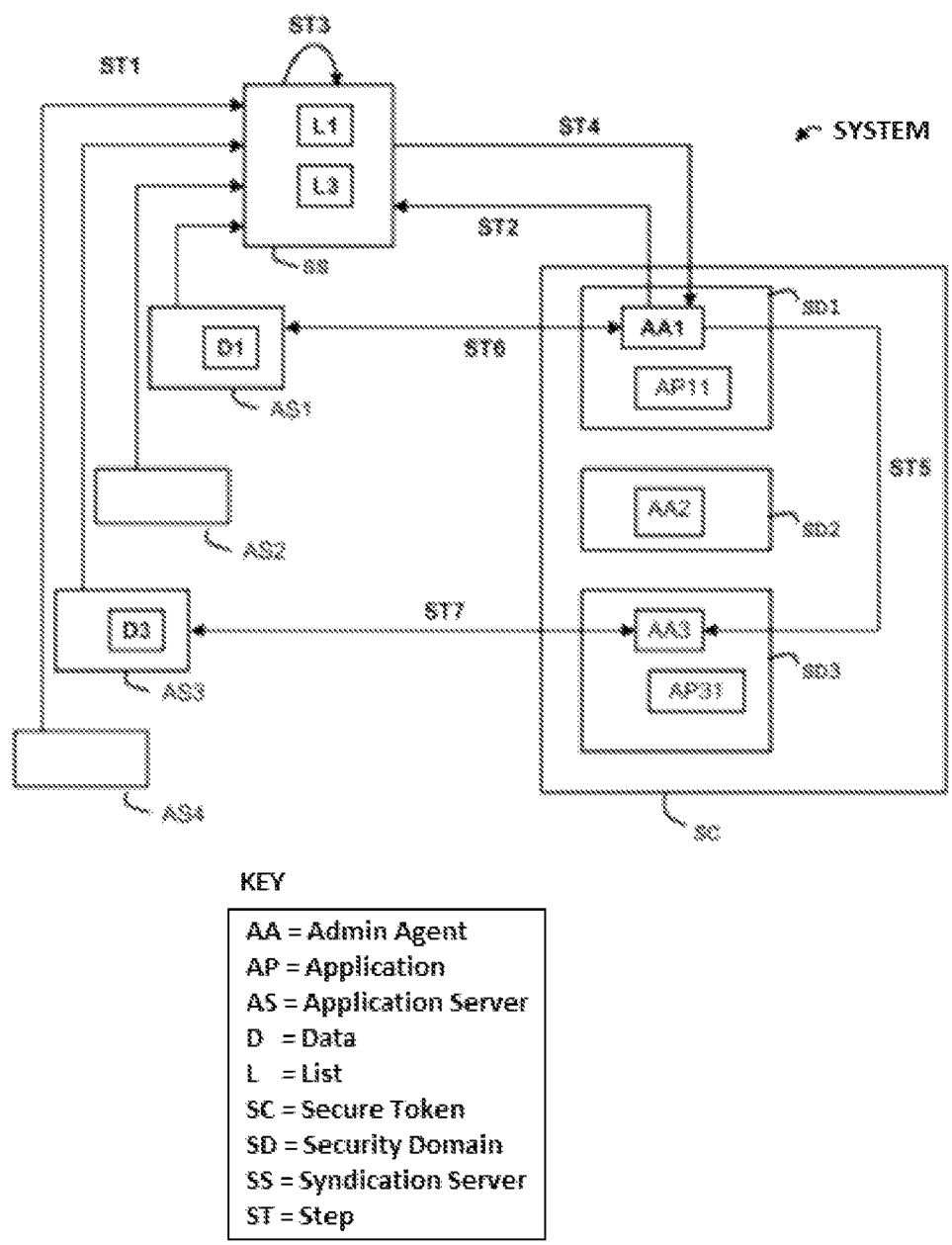
FIG. 1 depicts schematically an example of a system comprising a plurality of applications servers, a syndication server and a portable secure token according to the invention.

FIG. 1 shows an example of a system SY comprising a syndication server SS, a portable secure token SC and four application servers AS1, AS2, AS3 and AS4. FIG. 1 also shows an example of a method according to the invention.

In the example of FIG. 1, the portable secure token SC is a UICC which comprises three security domains SD1, SD2 and SD3. The security domain SD1 contains an admin agent AA1 and an application AP11. The admin agent AA1 is a component that is capable of managing an OTA over HTTP connection between the security domain SD1 and a distant server. The security domain SD2 contains an admin agent AA2. The security domain SD3 contains an admin agent AA3 and an application AP31.

The application server AS1 is a remote server which comprises a data D1 intended to be sent to the application AP11. The application server AS3 is a remote server which comprises a data D3 intended to be sent to the application AP31.

According to a first embodiment of the method of the invention, the application servers AS1 and AS3 declare their respective data D1 and D3 to the syndication server SS at step ST1. During the step ST1, two lists L1 and L3 are recorded into the syndication server SS. The list L1 contains a reference to the data D1, an identifier of application AP11 and an identifier of the token SC. The list L3 contains a reference to the data D3, an identifier of application AP31 and an identifier of the token SC.

The reference to the data D1, respectively D3, may contain a Uniform Resource Identifier (URI) of the application server AS1, respectively AS3.

Advantageously, the list L1 respectively, the list L3, may contain an identifier of a set of several portable secure tokens instead of the identifier of the token SC. This last embodiment allows targeting a collection of tokens with the same data stored into an application server.

Advantageously, the list L1 respectively, the list L3, may contain an identifier of the admin agent AA1, respectively AA3.

In one embodiment the list L3 is directly sent from the application server AS3 to the syndication server SS. Advantageously, the sending of the list L3 may be protected by relevant security features in order to guarantee confidentiality and integrity of the sent list. Such security features are well known from a person skilled in the art.

At the end of step ST1, both the list L1 and L3 are stored into the syndication server SS. Obviously, in other embodiments of the method, any number of list may be stored into the syndication server SS during the step ST1. For example, at the end of step ST1, the server SS may contain one, three or ten lists. Alternatively, the server SS may also contain no list if there is no data to be loaded into the portable secure token.

Then at step ST2, a polling request is sent from the token SC to the syndication server SS. The polling request is managed by the admin agent AA1. In the embodiment of FIG. 1, a polling mechanism is active in the admin agent AA1 only. In other words, neither the admin agent AA2 nor the admin agent AA3 sends any polling message. In a preferred embodiment, the polling request contains an identifier of the secure token SC.

At step ST3, the syndication server SS checks if it contains a list targeting the secure token SC. The identifier extracted from the received polling request may be used for identifying the relevant list. In the example of FIG. 1, the lists L1 and L3 are found as targeting the secure token SC. In other words the lists L1 and L3 target components embedded in the secure token SC.

In response to the received polling request, the syndication server SS builds a polling response which contains the two identified lists L1 and L3. The syndication server SS sends the polling response to the admin agent AA1 at step ST4. The polling response is received and analyzed by the admin agent AA1. By checking the content of the lists L1 and L3, the admin agent AA1 identifies the list L1 as targeting the application AP11 and the list L3 as targeting the application AP31. In particular, the admin agent AA1 may use the application identifier contained in each received list.

Then at step ST5, the admin agent AA1 sends the list L3 to the admin agent AA3 which is in charge of managing the application AP31. The list L3 contains the identifier of the application AP31. The operating system of the secure token SC is able to identify the security domain SD3 that contains the application AP31. Then the admin agent AA3 that belongs to the identified security domain SD3 is identified as the admin agent in charge of the application AP31.

At step ST6, the admin agent AA1 opens a communication session with the distant application server AS1 in order to get the data D1. This communication session may be performed through OTA over HTTP or any relevant communication channel. Then the admin agent AA1 receives the data D1 and provides the application AP11 with the data D1.

At step ST7, the admin agent AA3 opens a communication session with the distant application server AS3 in order to get the data D3. The list L3 contains connectivity data which allows the admin agent AA3 to access the relevant application server AS3. For example the connectivity data may be the URL (Uniform Resource Locator) of the server AS3. The connectivity data may also contain data related to security parameters of security level to be used for accessing the application server.

Advantageously, the admin agent AA3 may be able to automatically contact a preset URL. For example, the admin agent AA3 may have access to a predefined parameter containing the URL of the server AS3.

This communication session may be performed through an OTA over HTTPS or any relevant communication channel. Then the admin agent AA3 receives the data D3 and provides the application AP31 with the data D3. The data D3 may contain an updated version of the application AP31, applicative data to be used by the application AP31 or security data (like a secret key) to be used by the application AP31. The data D3 may also contain a command or an applicative parameter.

Advantageously, a feedback is provided to the syndication server SS when the data is sent by an application server to the secure token SC. Such a feedback allows avoiding a further sending of the same data to the secure token SC. Such a feedback may be sent either by the application server or by the secure token SC.

In another embodiment, the syndication server SS may contain only the list L3. Thus, in response to a polling request, the admin agent AA1 receives a polling response containing only the list L3. In such a case, the admin agent AA1 analyzes the received polling response and sends the list L3 to the admin agent AA3. The admin agent AA1 does not send any data to the application belonging to its security domain SD1. The admin agent AA1 remains in charge of its polling mechanism and will send another polling request to the syndication server SS.

In the embodiment of FIG. 1, the admin agents AA2 and AA3 do not manage any polling mechanism.

Advantageously, only the admin agent AA1 has a polling policy.

In a preferred embodiment, the admin agent AA1 belongs to the Issuer Security Domain (ISD) as defined by Global Platform Card Spec V2.2 standard.

It is to be noted that each admin agent of the portable secure token SC may also have its own polling mechanism in parallel of the polling mode of the invention. Thus the method of the invention is compatible with a secure token comprising an admin agent which must keep its own polling mechanism.

In one embodiment, the protocol used for the polling messages is HTTP. For example, the polling requests may be performed through "HTTP post" messages and the polling responses may be performed through "HTTP post response" messages. The polling responses may contain a dedicated content-type specific to the invention. Such a new specific content-type allows the recipient admin agent to know how to analyze the received message.

For instance the following "POST message" may be sent:
"POST/server/syndicationServer HTTP/1.1 CRLF
Host: 172.96.0.1 CRLF
User-Agent: syndication/1.0 CRLF
CRLF"

In response, the following "POST response message" may be sent:
"HTTP/1.1 200 OK CRLF
User-Agent: syndication/1.0 CRLF
Content-Type: application/vnd.card-syndication/1.0 CRLF
Content-Length: xxxx CRLF
CRLF
[L1]
[L3]"

where "xxxx" stands for the number of bytes of the conveyed data.

In one embodiment, the polling messages may be sent through a first type of communication channel and the messages exchanged between the application servers and the admin agents may be sent through a second type of communication channel.

Advantageously, the first type of communication channel may have a light security level since no critical data is exchanged through this channel. On the other hand, the second type of communication channel may have a high security level. For example, the first type of communication channel may be HTTP and the second type of communication channel may be HTTPS. Thanks to this particular embodiment, time and resource bandwidth may be saved when treating polling messages because establishing a HTTP session requires less resource and time than establishing a HTTPS session.

Thus if no data is to be retrieved from application server, no HTTPS connection is established.

Figure 2:
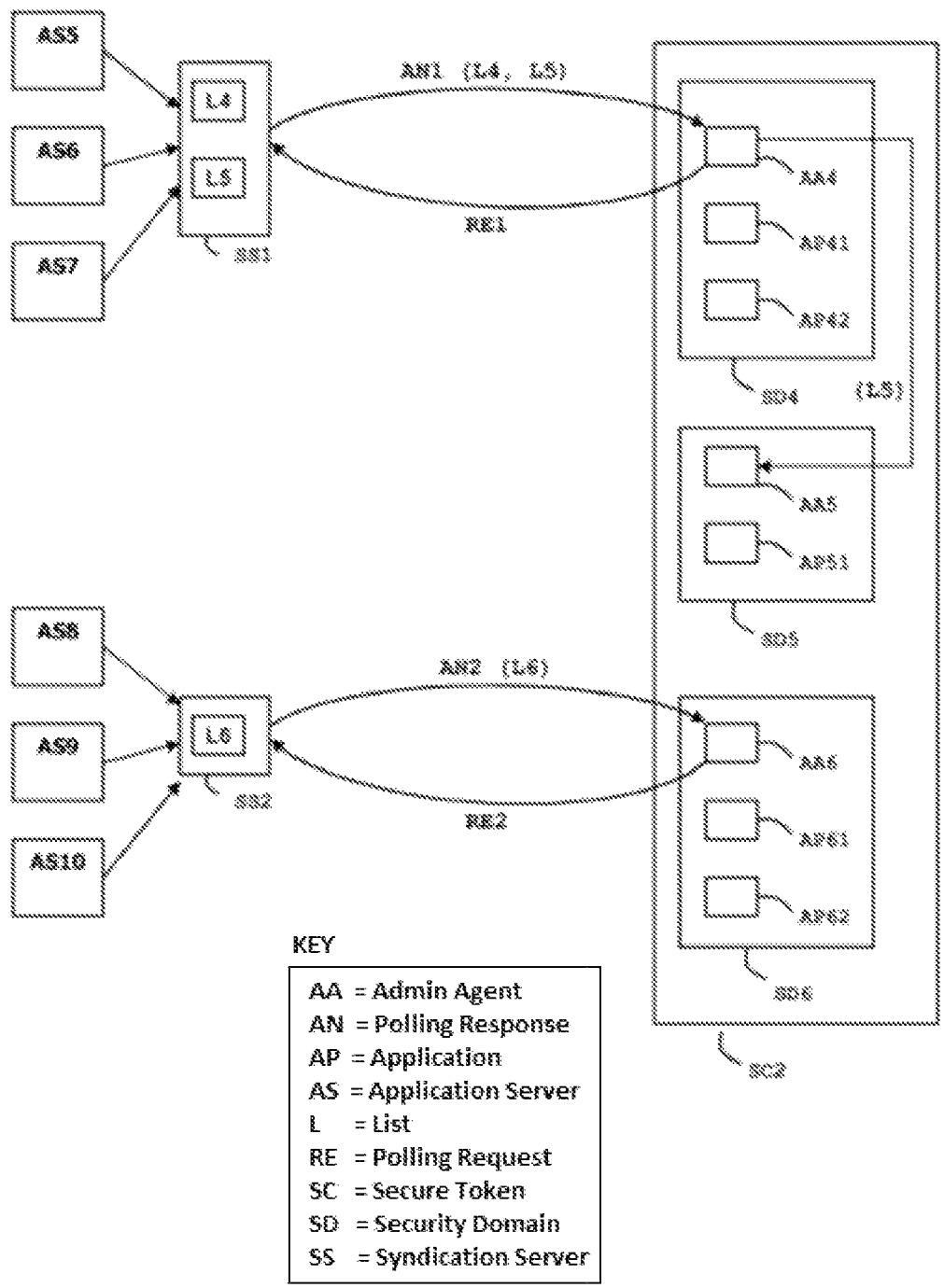
FIG. 2 depicts schematically another example of a system comprising a plurality of applications servers, two syndication servers and a portable secure token according to the invention.

FIG. 2 provides a second example of a system which comprises two syndication servers SS1 and SS2, a portable secure token SC2 and six application servers AS5 to AS10.

In the example of FIG. 2, the portable secure token SC2 is a SIM card which comprises three security domains SD4, SD5 and SD6. The security domain SD4 contains an admin agent AA4 and two applications AP41 and AP42. The security domain SD5 contains an admin agent AA5 and an application AP51. The security domain SD6 contains an admin agent AA6 and two applications AP61 and AP62.

The syndication server SS1 comprises two lists L4 and L5 which targets respectively the applications AP42 and AP51. Each of the lists L4 and L5 contain a reference to data stored into application servers AS5 to AS7. According to one embodiment of the invention, the admin agent AA4 is in charge of managing a polling mechanism for both the security domains SD4 and SD5.

The syndication server SS2 comprises one list L6 which targets the applications AP62. The list L6 contains a reference to data stored into one of the application servers AS8 to AS10. According to one embodiment of the invention, the admin agent AA6 is in charge of managing a polling mechanism for the security domain SD6 only. Thus two polling mechanisms may be managed simultaneously in the token SC2. This embodiment may be relevant in order to manage the communication with several clusters of application servers. In the example of FIG. 2, applications servers AS5, AS6 and AS7 belong to a first cluster whereas applications servers AS8, AS9 and AS10 belong to a second cluster.

The admin agent AA4 is in charge of the polling management for the cluster (AS5, AS6 and AS7) linked to the syndication server SS1.

For example the admin agent AA4 may send a polling request RE1 to the syndication server SS1. In response to RE1, the server SS1 may send a polling response AN1 which contain two lists L4 and L5. Assuming that the list L5 targets a component belonging to the security domain SD5, the list L5 is sent from the admin agent AA4 to the admin agent AA5. Then the list L5 is used for retrieving data in the relevant application server belonging to the cluster linked to the syndication server SS1.

The admin agent AA6 is in charge of the polling management for the cluster (AS8, AS9 and AS10) linked to the syndication server SS2.

The admin agent AA6 may send a polling request RE2 to the syndication server SS2. In response to RE2, the server SS2 may send a polling response AN2 which contain the list L6. Assuming that the list L6 targets one component belonging to the security domain SD6, the list L6 is used for retrieving data in the relevant application server belonging to the cluster linked to the syndication server SS2.

Figure 3:
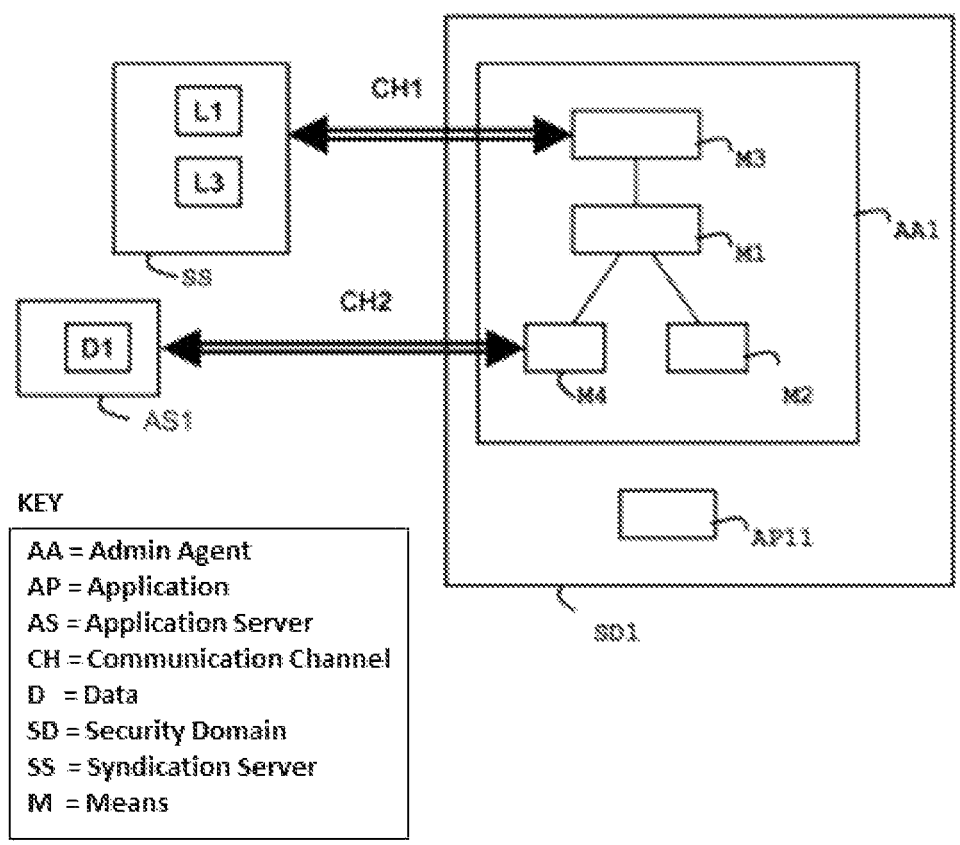
FIG. 3 depicts schematically an example of a security domain comprising an admin agent according to the invention.

FIG. 3 provides a detailed example of the security domain SD1 of the FIG. 1.

The security domain SD1 comprises an admin agent AA1 and an application AP11 intended to receive data from a distant application server AS1.

The admin agent AA1 comprises four means M1, M2, M3 and M4. The means M1 is adapted to analyze the content of the polling responses and to identify the admin agents which are targeted by this content. The means M1 is able to extract the data to be sent to each targeted admin agent.

The means M2 is adapted to send the relevant data to each targeted admin agent. In other words, the means M2 is capable of notifying each targeted admin agent of the secure token with the list of data to be retrieved on application server side. The means M2 is also adapted to send the relevant data to the targeted application belonging to the security domain SD1. Such sending of data may be implemented through mechanisms which are well known by a person skilled in the art. For instance, such a mechanism is used for sending data for the Remote Application Management (RAM) over HTTP.

The means M3 is adapted to establish a communication channel CH1 with the syndication server SS. This channel CH1 is established through a host machine (not shown at FIG. 3) connected to the token SC. The means M3 is adapted to send and receive polling messages through the communication channel CH1. In one embodiment the communication channel CH1 is OTA over HTTP.

The means M4 is adapted to establish a communication channel CH2 with the application server AS1. This channel CH2 is established through a host machine (not shown at FIG. 3) connected to the token SC. The means M4 is adapted to send and receive messages in order to retrieved data D1 through the communication channel CH2 in a secure way. In one embodiment the communication channel CH2 is OTA over HTTPS.

The four means M1 to M4 have been described as four distinct components. They may be implemented as one or several components.

In the above-described embodiments, the portable secure token SC is a UICC or a SIM card. Such tokens comprise an operating system OS, a working memory, a microprocessor, a non volatile memory and a communication interface for communicating with a host machine. The invention also applies to tokens such as contact or contactless smart cards, USB tokens, NFC tokens, etc.

Thanks to the invention, a polling mechanism that is common to a plurality of admin agents is managed by one admin agent only. The admin agent in charge of the polling management polls the syndication server in order to know if at least one admin agent of the plurality of admin agents must retrieve data from an application server. The syndication sends a list of activities to be performed in the portable secure token. Each item of the list is notified to the targeted admin agent. Each targeted admin agent establishes a communication session with the relevant application server in order to get the data to be transferred. Compared with usual polling modes in tokens of the prior art, the invention allows to avoid a huge number of polling messages which do not lead to a transfer of data between an application server and the secure portable token.

The data retrieved by the token SC from a application server may be an upgrade of a executable component of an application embedded in the token, security parameters or applicative parameters related to an application embedded in the secure token.

An advantage of the invention is to allow saving the OTA bandwidth when a large number of UICC or SIM cards is deployed on the field. In particular, the invention allow to optimize the polling mechanism for remote application management (RAM) over HTTP/HTTPS, remote application management (RFM) over HTTP/HTTPS and Smart card Web server (SCWS) management over HTTP/HTTPS. The invention allows saving resources of mobile network of Mobile Network Operators (MNO).

Although the above-described embodiments are oriented on OTA over HTTP or HTTPS, the invention also applies to any kind of communication channel wherein the connection is made on token initiative. For instance, the invention applies to communication channel of HTTP over TCP/IP type. The invention also applies to communication channel of CAT-TP (Card Application Transport Protocol) over UDP (User Datagram Protocol) or any protocol used over a BIP (Bearer Independent Protocol) channel.

The invention claimed is:

1. A method for loading data into a portable secure token, the method comprising:

receiving, by a syndication server and from a remote application server, an indication of first data available for download from the remote application server, said syndication server being distinct from said remote application server;

storing, at the syndication server, a list referencing the first data;

receiving, by the syndication server and from a first administration agent of a first security domain of the portable secure token, a polling request;

determining, by the syndication server and based upon the polling request, that the first data is available for download by the portable secure token from the remote application server; and sending, from the syndication server and to the first administration agent of the portable secure token, a polling response, wherein the polling response comprises the list referencing the first data, sending the list referencing the first data, from the first administration agent of the first security domain to a second administration agent of a second security domain of the secure portable token, and providing the first data from the second administration agent to an application of the second security domain of the portable secure token.

2. The method according to claim 1, wherein said method comprises the steps of:

receiving, by the second administration agent, said list, retrieving, from the remote application server and by the second administration agent, said first data referenced by the list.

3. The method according to claim 1, wherein said method further comprises the steps of:

receiving, by the syndication server and from one of the remote application server and the secure portable token, feedback indicating that the first data has been loaded into the secure token; and updating, by the syndication server, the list.

4. The method according to claim 1, wherein said method further comprises the steps of:

receiving, from a second remote application server, an indication of second data available for download from the second remote application server; and storing, at the syndication server, a list referencing the second data, wherein the determining step further comprises determining that the second data is available for download by the portable secure token, and wherein the polling response further comprises the second list.

5. The method according to claim 1, wherein said method further comprises the steps of:

retrieving, from the remote application server and by the second administration agent of the second security domain of the portable secure token, said first data referenced by the list.

6. The method according to claim 1, wherein the polling request is formatted according to a first communication protocol, wherein said method further comprises the step of:

retrieving, by the portable secure token and from the remote application server, said first data, wherein said first data is retrieved according to a second communication protocol having security features superior to the first communication protocol.

7. The method according to claim 6, wherein said first communication protocol is HyperText Transfer Protocol (HTTP) and said second communication protocol is HyperText Transfer Protocol Secure (HTTPS).

8. A portable secure token configured to communicate with a system comprising a remote application server and a syndication server, said remote application server being distinct from said syndication server, said portable secure token comprising:

a microprocessor; and a memory comprising a plurality of security domains, comprising:

a first security domain, the first security domain comprising a first administration agent, said first administration agent being configured to:

(i) send a polling request to the syndication server, (ii) receive a polling response from the syndication server, wherein the polling response comprises a list referencing first data available for retrieval from the remote application server, and (iii) determine that the list references the first data available for retrieval from the remote application server, and a second security domain, the second security domain comprising a second administration agent, said second administration agent being configured to:

(i) receive the list, referencing the first data, included in said polling response from the first administration agent, (ii) retrieve the first data from the remote application server based upon the list referencing first data, and (iii) provide said first data to an application of the second security domain of the portable secure token.

9. The portable secure token according to claim 8, wherein said first administration agent is configured to send the polling request through a first communication protocol and wherein said second administration agent is configured to load the first data in the secure token through a second communication protocol which has security features superior to the first communication protocol.

10. The portable secure token according to claim 9, wherein said first communication protocol is HyperText Transfer Protocol (HTTP) and said second communication protocol is HyperText Transfer Protocol Secure (HTTPS).

11. The portable secure token of claim 8, wherein the plurality of security domains behave as security domains defined by Global Platform Smart Card Specifications V2.2.

12. The portable secure token of claim 8, wherein the portable secure token is configured to transmit feedback to the syndication server upon retrieval of the first data from the remote application server.

13. A system comprising:

a portable secure token, said portable secure token comprising a plurality of security domains in which a first security domain comprises a first administration agent, and in which a second security domain comprises a second administration agent;

a remote application server comprising a first data available for download by the portable secure token; and a syndication server, distinct from the remote application server, configured to:

(i) receive an indication that the first data is available for download, (ii) store a list comprising a reference to the first data available for download, (iii) receive a polling request from the first administration agent, (iv) determine, based upon the polling request, that the first data is available for download by the secure portable token, and (v) send a polling response to the first administration agent comprising the list referencing the first data, in response to the polling request, wherein the first administration agent of the first security domain is configured to:

(i) receive, from the syndication server, the list referencing the first data, and (ii) send the list referencing the first data to the second administration agent of the second security domain of the secure portable token, and wherein the second administration agent of the second security domain is configured to provide said first data to an application of the second security domain of the portable secure token.

14. The system of claim 13, wherein the syndication server is further configured to receive feedback from one of the remote application server and the portable secure token when the first data is loaded into the portable secure token from the remote application server.

* * * * *